(12) United States Patent
Lares

(10) Patent No.: US 10,816,024 B2
(45) Date of Patent: *Oct. 27, 2020

(54) LIGHTWEIGHT FASTENER DESIGN

(71) Applicant: Cold Heading Company, Warren, MI (US)

(72) Inventor: Alan M. Lares, Pleasant Ridge, MI (US)

(73) Assignee: Cold Heading, Inc., Warren, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,175

(22) Filed: Apr. 15, 2019

(65) Prior Publication Data

US 2019/0242422 A1    Aug. 8, 2019

Related U.S. Application Data

(63) Continuation of application No. 14/939,190, filed on Nov. 12, 2015, now Pat. No. 10,302,119.

(60) Provisional application No. 62/121,465, filed on Feb. 26, 2015.

(51) Int. Cl.
| | |
|---|---|
| *F16B 35/06* | (2006.01) |
| *F16B 23/00* | (2006.01) |
| *B21J 5/08* | (2006.01) |
| *B21K 1/46* | (2006.01) |

(52) U.S. Cl.
CPC ............ *F16B 23/0038* (2013.01); *B21J 5/08* (2013.01); *B21K 1/46* (2013.01)

(58) Field of Classification Search
CPC .............................. F16B 23/0038; B21K 1/46
See application file for complete search history.

(56) References Cited

U.S. PATENT DOCUMENTS

| | | | | |
|---|---|---|---|---|
| 4,189,976 A | * | 2/1980 | Becker | F16B 23/0092 411/396 |
| 4,627,774 A | * | 12/1986 | Bradley | F16B 31/021 411/410 |
| 5,934,851 A | * | 8/1999 | Stewart | B21K 1/46 411/113 |
| 6,045,311 A | * | 4/2000 | Chang | B25B 13/04 411/402 |
| 6,328,512 B1 | * | 12/2001 | Miranda | F16B 31/021 411/410 |

* cited by examiner

*Primary Examiner* — Gary W Estremsky
(74) *Attorney, Agent, or Firm* — Dickinson Wright PLLC

(57) ABSTRACT

An improved fastening device includes a shank portion with a first end and a second end disposed from the first end. The fastening device includes a head portion disposed adjacent the second end of the shank portion The head portion of the fastening device includes a lower perimeter adjacent the second end of the shank portion, an upper perimeter disposed away from the lower perimeter and a body portion extending between the lower perimeter and the upper perimeter. The head portion is configured to engage a standard hex-shaped socket. The lower perimeter of the head portion has a generally hex shape and the upper perimeter has a different shape than the lower perimeter.

23 Claims, 4 Drawing Sheets

LIGHTWEIGHT FASTENER DESIGN

CROSS-REFERENCE TO RELATED APPLICATIONS

The present application is a Continuation Application of U.S. patent application Ser. No. 14/939,190, titled "Lightweight Fastener Design", filed Nov. 12, 2015, which claims the benefit of U.S. Provisional Patent Application Ser. No. 62/121,465, entitled "ForHEX—Four Point Contact Hex-Head Design to Reduce Mass in Traditional Head Fasteners", filed Feb. 26, 2015, both of which are hereby incorporated by reference as though set forth fully herein.

TECHNICAL FIELD

The present disclosure relates generally to a new fastener design for use in securing parts. More specifically, the present disclosure relates to a new fastener design for use in securing parts that utilizes less material, is less expensive, and provides an efficient torque transfer head design.

BACKGROUND OF THE DISCLOSURE

One common type of fastener includes what is known as a "hex-head" design. FIG. 1 illustrates an exemplary known "hex-head" fastener, as generally represented by reference number 10. As is known, this type of fastener 10 utilizes a hex-shaped head 12 that allows for the application of driving torque to insert the fastener into a workpiece (not shown). These fasteners 10 also generally include threads 14 that assist with the insertion of the fastener into the workpiece to effectuate securement.

While traditional hex-head designs work for their intended purpose, they are not optimized for weight and thus are over-designed. As is known, with common hex-heads, only a very small portion of each segment of the hex may be utilized for torque application. More specifically, as is known, during installation of a fastener, a standard hex socket will transfer the applied torque to a traditional hex-head fastener via six (6) contact points on the flats of the fastener head. This is due to the fact that the tool utilized to drive the hex-head includes a receptacle for engaging the fastener head that is also hex-shaped. Because the internal hex of the tool may be slightly larger dimensionally than the hex-head of the fastener (in order to slip it freely over the head-head) the tool can rotate slightly before it contacts the fastener hex during initial driving.

As is known, in order to meet growing EPA regulations, and specifically CAFE regulations in the automotive industry, OEMs are constantly striving for lighter automobiles. Lighter automobiles can yield increased gas mileage. To achieve lighter vehicles, OEMs constantly urge their suppliers to design lighter parts. As most automobiles utilize a large number of fasteners, reducing the mass and/or weight of a fastener has the potential to provide significant weight savings for a vehicle and thus improved gas mileage.

SUMMARY OF THE DISCLOSURE

It is therefore an aspect of the present disclosure to provide an improved fastener design that has a reduced mass compared to prior conventional hex-head fasteners.

It is a related aspect to provide an improved fastener design for use in automotive applications that has a reduced mass compared to prior conventional hex-head fasteners.

It is another aspect of the present disclosure to provide an improved fastener design that provides cost savings over prior conventional hex-head fasteners.

In is still another aspect of the present disclosure to provide an improved fastener design that yields efficient torque application capabilities.

It is yet another aspect of the present disclosure to provide an improved fastener design for automotive applications that can help with improved gas mileage.

In accordance with the above and the other aspects of the present disclosure, an improved fastener design is provided. The fastening device includes a shank portion with a first end and a second end disposed remote from the first end. The fastening device includes a head portion disposed adjacent the second end of the shank portion The head portion of the fastening device includes a lower perimeter adjacent the second end of the shank portion, an upper perimeter disposed away from the lower perimeter and a body portion extending between the lower perimeter and the upper perimeter. The head portion is configured to engage a standard hex-shaped socket. The lower perimeter of the head portion has a generally hex shape and the upper perimeter has a different shape than the lower perimeter.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE DISCLOSURE

The present disclosure relates to a fastener apparatus 20 for securing objects to one another. According to an aspect, the disclosed fastener apparatus 20 may be employed to secure objects in the automotive industry. It will be appreciated that the fastener apparatus 20 may be employed in a variety of other industries. It will also be appreciated that the fastener apparatus 20 can be used to secure a variety of different objects together. The fastener apparatus 20 can be a bolt. However, it may be configured as a variety of other suitable fasteners.

Figure 1:
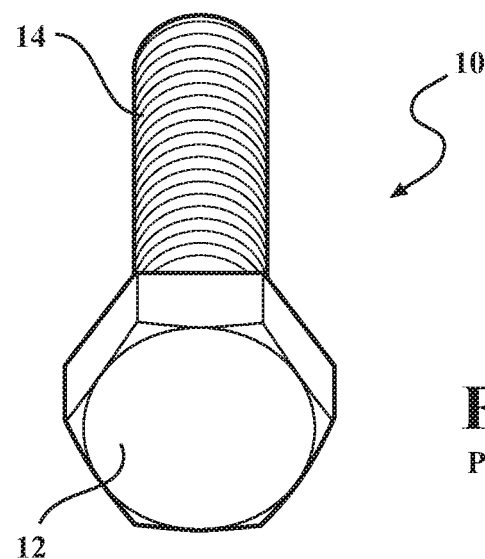
FIG. 1 is a perspective view of fastener device with a hex-head shape according to the prior art.
Figure 2:
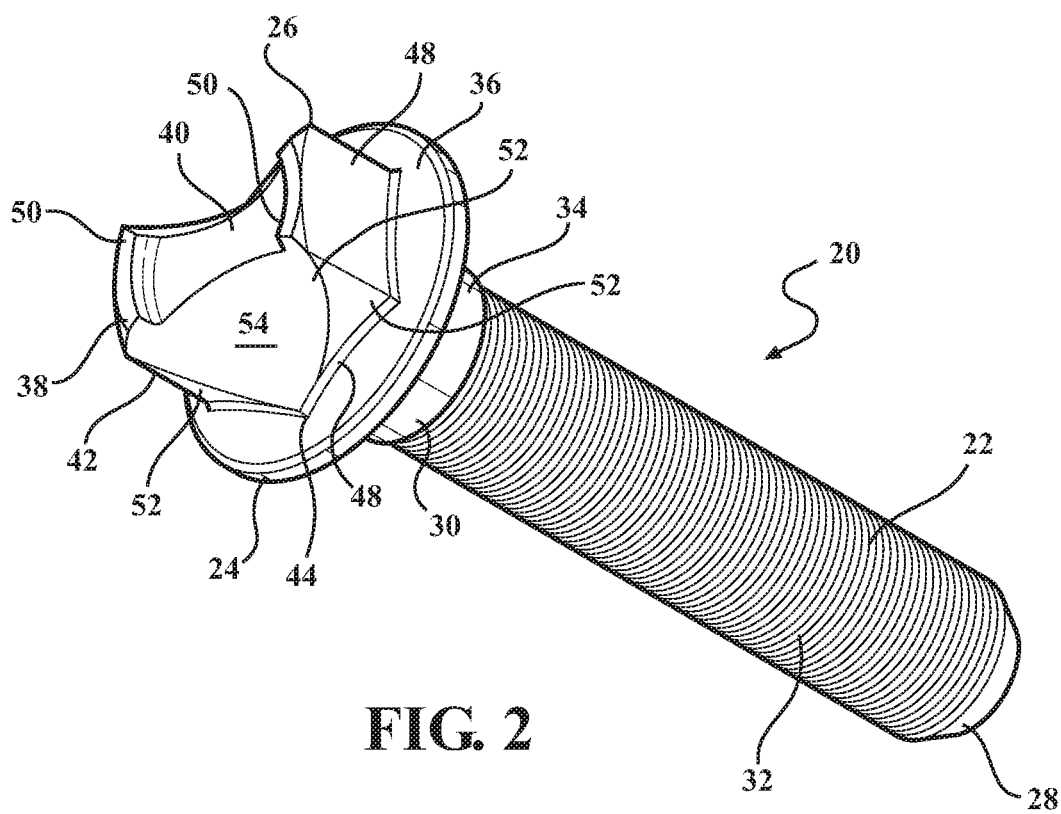
FIG. 2 is a perspective view of a fastener device according to an aspect of the disclosure.
Figure 3:
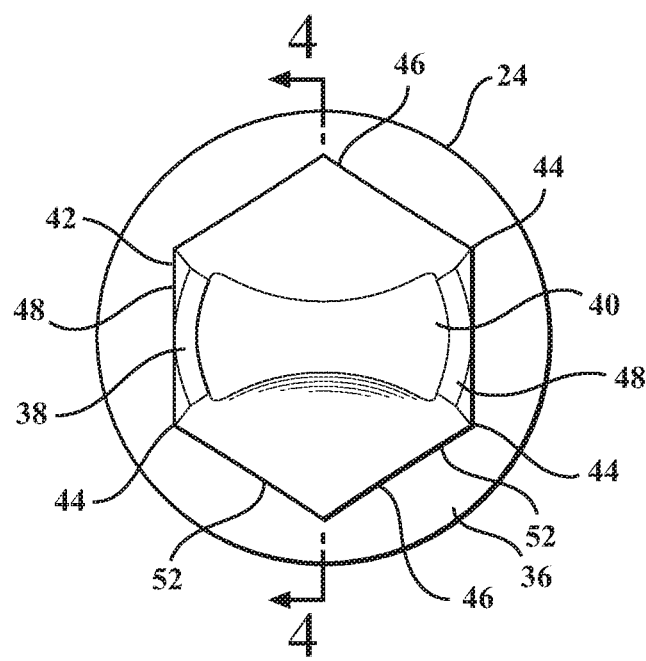
FIG. 3 is a top view of the fastener device of FIG. 2.
Figure 4:
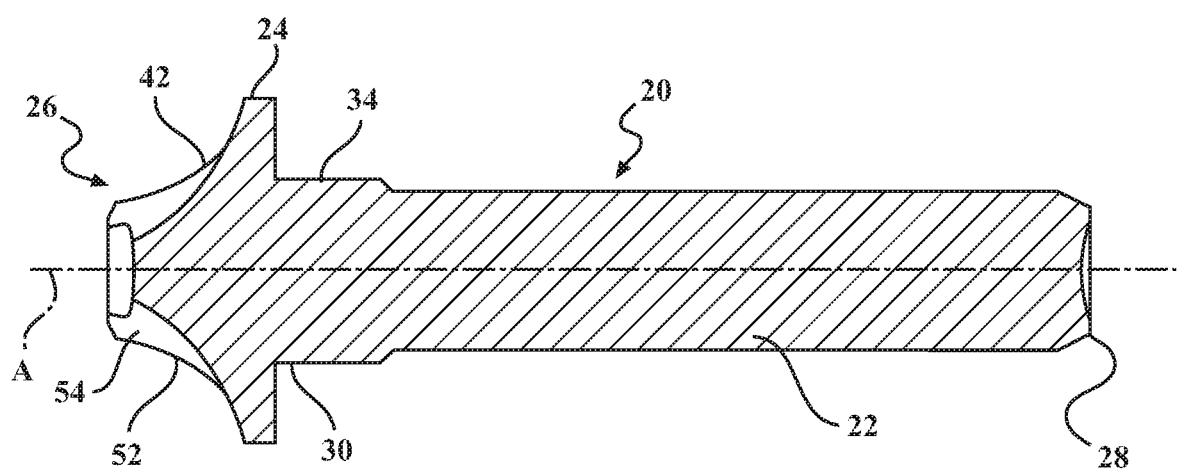
FIG. 4 is a cross-sectional illustration of the fastener device of FIG. 3 along the lines 4-4.

According to an aspect, and with reference to FIGS. 2 through 4, the fastening apparatus 20 can generally include a shank portion 22, a flange portion 24, and a head portion 26. As shown, the shank portion 22 can extend generally along an axis A between a first end portion 28 and a second end portion 30 disposed remotely from the first end portion 28. According to an aspect, the first end portion 28 may have a generally flat shape. However, it will be appreciated that the first end portion 28 can have a variety of different shapes or configurations, including rounded, pointed or recessed. According to a still further aspect, the fastening apparatus 20 can include a spiral thread 32 formed around the exterior of the shank portion 22 between the first end portion 28 and the second end portion 30. As is known, threads can assist in retaining the fastening apparatus in place in the workpiece. According to another aspect, the shank portion 22 can include an enlarged shoulder portion 34 adjacent the second end portion 30. The enlarged shoulder portion 34 can provide for increase shear strength for the fastening apparatus 20. The enlarged shoulder portion 34 can also serve to create some separation between mating components. It will be appreciated that the shank portion 22 can have a variety of different configurations and could have other features not specifically shown or described.

According to another aspect, the flange portion 24 can have a circular shaped cross-section and it may be disposed at or adjacent the second end portion 30 of the shank 22. The flange portion 24 can present a platform along a plane that is transverse to the axis A. The flange portion 24 can have a variety of different shapes, including oval.

According to a further aspect, the head portion 26 can extend axially away from an upper surface 36 of the flange portion 24. As shown, the head portion 26 can have a top surface 38 that includes a depression 40 with a generally circular shaped cross-section. The depression 40 can extend axially into the top surface 38 toward the shank portion 22. It will be appreciated that the depression 40 can have a variety of different shapes. According to an aspect, the head portion 26 can include a body portion 42 that extends between the flange portion 24 and the top surface 38. According to another aspect, the head portion 26 may have a generally hexagonally-shape. However, it will be appreciated that the head portion 26 can have a variety of different shapes. According to a further aspect, the body portion 42 may be generally defined by six lower corners 44 and six lower edge portions 46 that extend between the lower corners 44. According to an aspect, the body portion 42 can also include a pair of sidewalls 48 that extend axially away from one of the lower edge portions 46 in spaced and parallel relationship with one another. According to an aspect, each of the sidewalls 48 can terminate in a corresponding pair of upper corners 50 that are axially aligned with a pair of the lower corners 44 at the upper surface 36. According to a still further aspect, a pair of partial side surfaces 52 can extend away from each of the upper corners 50 and away from an adjacent one of the pair of sidewalls 48. The partial side surfaces 52 can converge toward each other and meet at one of the lower corners 44. The partial surfaces 52 can converge in a curved or linear fashion. The partial side surfaces 52 can define a chambered wall 54 therebetween, which may be configured as a single arcuate surface. However, the chamfered wall 54 may take on a variety of different shapes.

Figure 5:
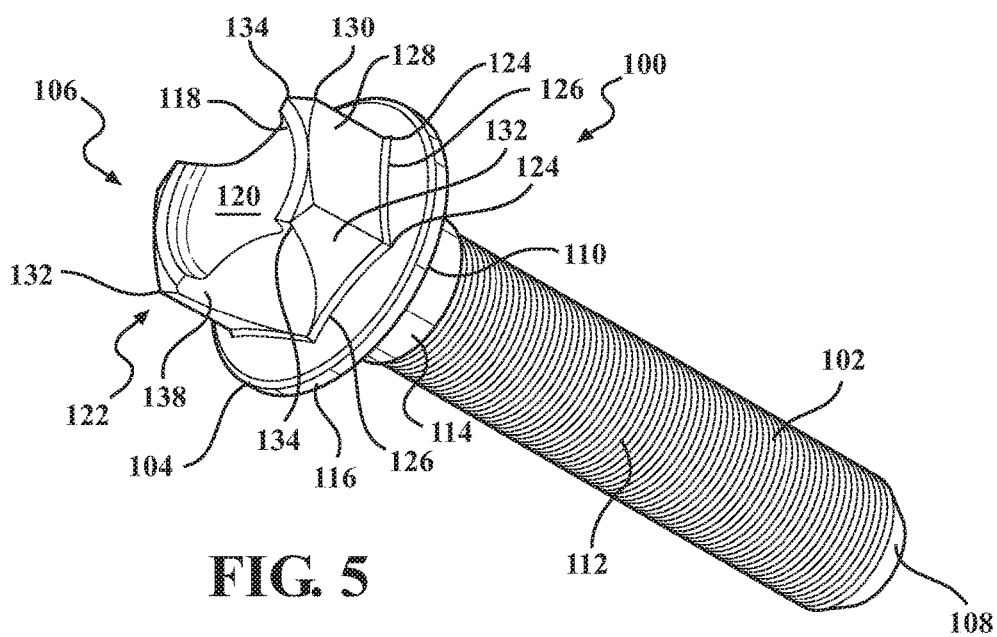
FIG. 5 is a perspective view of a fastener device according to another aspect of the disclosure.
Figure 6:
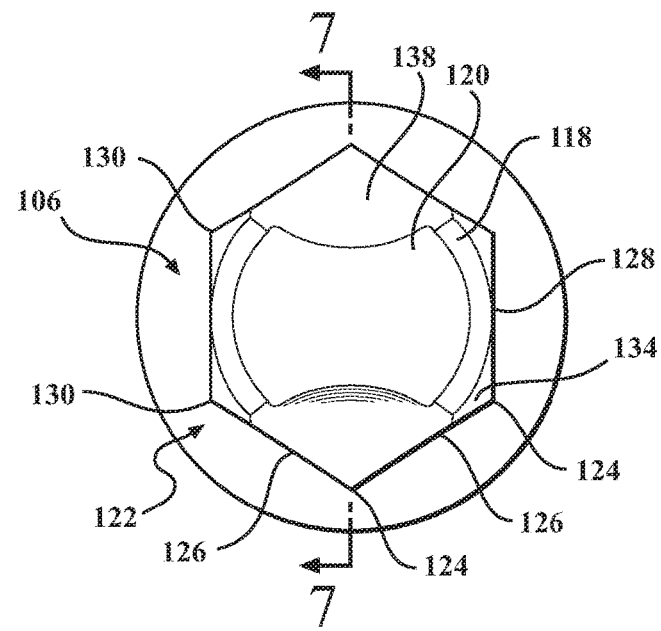
FIG. 6 is a top view of the fastener device of FIG. 5.
Figure 7:
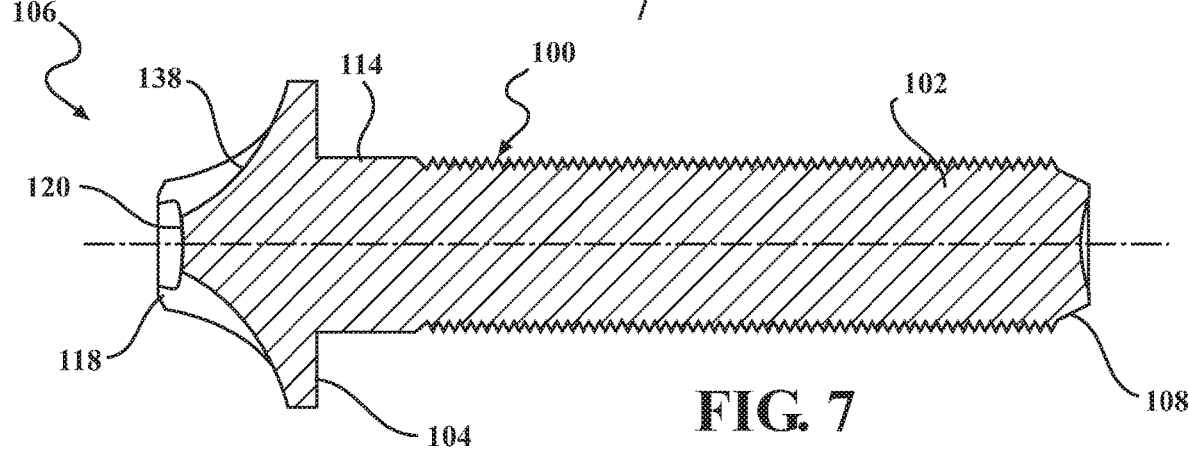
FIG. 7 is a cross-sectional illustration of the fastener device of FIG. 6 along the lines 7-7.

With reference to FIGS. 5 through 7, which illustrate a fastening apparatus 100 according to another aspect of the disclosure. The fastening apparatus 100 can generally include a shank portion 102, a flange portion 104, and a head portion 106. As shown, the shank portion 102 can extend generally along an axis A between a first end portion 108 and a second end portion 110 disposed remotely from the first end portion 108. According to an aspect, the first end portion 108 may have a generally flat shape. However, it will be appreciated that the first end portion 108 can have a variety of different shapes or configurations, including rounded, pointed or recessed. According to a still further aspect, the fastening apparatus 100 can include a spiral thread 112 formed around the exterior of the shank portion 102 between the first end portion 108 and the second end portion 110. According to another aspect, the shank portion 102 can include an enlarged shoulder portion 114 adjacent the second end portion 110. The enlarged shoulder portion 114 can provide for increased shear strength for the fastening apparatus 100 and also serve to keep the components being secured somewhat separated. It will be appreciated that the shank portion 102 can have a variety of different configurations and could have other features not specifically shown or described.

According to another aspect, the flange portion 104 can have a circular shaped cross-section and may be disposed at or adjacent the second end portion 110 of the shank 102. The flange portion 104 can present a platform along a plane that is transverse to the axis A. The flange portion 104 can have a variety of different shapes, including oval.

According to a further aspect, the head portion 106 can extend axially away from an upper surface 116 of the flange portion 104. As shown, the head portion 106 can have a top surface 118 that includes a depression 120 with a generally circular shaped cross-section. The depression 120 can extend axially into the top surface 118 toward the shank portion 102. It will be appreciated that the depression 120 can have a variety of different shapes. According to an aspect, the head portion 106 can include a body portion 122 that extends between the flange portion 104 and the top surface 118. According to another aspect, the head portion 106 may have a generally hexagonally-shape. However, it will be appreciated that the head portion 106 can have a variety of different shapes. According to a further aspect, the body portion 122 may be generally defined by six lower corners 124 and six lower edge portions 126 that extend between the lower corners 124. According to an aspect, the body portion 122 can also include a pair of sidewalls 128 that extend axially away from one of the lower edge portions 126 in spaced and parallel relationship with one another. According to an aspect, each of the sidewalls 128 can terminate in a pair of upper corners 130 that are axially aligned with a pair of the lower corners 124 at the upper surface 116. According to a still further aspect, a pair of partial side surfaces 132 can extend away from a distal point 134 adjacent each of the upper corners 130 and converge towards each other at meet at one of the lower corners 124. The location of the distal point 134 with respect to the upper corners 130 can obviously vary. The partial side surface 132 can converge in a curved or linear fashion. The partial side surfaces 132 can define a chamfered wall 138 therebetween. According to an aspect, the pair of chamfered walls 138 can extend from a pair of the distal points 134 to one of the lower corners 124 of the base generally in a V-shape to provide for reduced mass of fastening apparatus 20 while maintaining structural integrity of the fastening apparatus 20 during tightening and loosening with respect to the workpiece. The chamfered wall 138 can be arcuate or curved as shown. However, the chamfered wall 138 may take on a variety of different shapes.

It will be appreciated that while the lower perimeter of the body portion 122 as defined by the lower corners 124 and lower edge portions 126 can define a hex shape, the upper perimeter as defined by the upper corners 130 and the upper edge surfaces may define a different shape. The lower perimeter may have a greater dimension that than the upper perimeter, which can provide significant reduction in weight savings.

Figure 8:
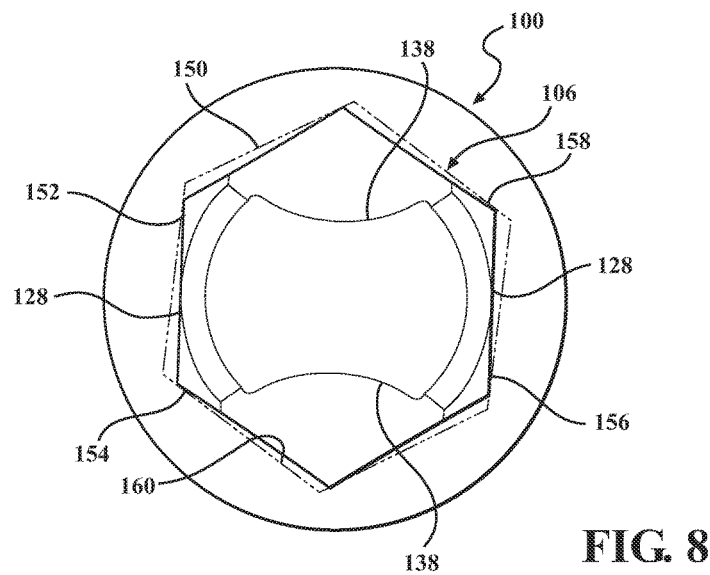
FIG. 8 is a schematic illustration of torque transfer between a head portion of a fastener device and hex socket according to an aspect of the disclosure.

With reference to FIG. 8, according to an aspect, during insertion (tightening) or removal (loosening) of the fastening apparatus 100, a socket 150 having a receptacle 160 can be disposed over the head portion 106 of the fastening apparatus 100. According to another aspect, the socket receptacle 160 can have a hex shape that generally corresponds to that of the head portion 106. However, the socket receptacle 160 may be formed slightly larger than the head portion 106 so as to allow insertion thereover. In operation, the socket receptacle 160 can engage a combination of the sidewalls 128 and the partial side surfaces 132 adjacent to the upper corners 130 such that there are a total of four contact points between the socket receptacle 160 and the head portion 106 to tighten or loosen the fastening apparatus 100. According to an aspect, the disclosed head design can transfer the applied moment from the socket 150 to the fastener by way of four (4) separate contact points 152, 154, 156, 158 along flat surfaces of the fastener head portion 106 without degradation in bolt performance. According to an aspect, the profile of the chamfered walls 138 and their positions opposing one another in a location corresponding to the location of two opposite traditional hex corners can aid in cold forming the shape of the head portion 106, as discussed below.

FIGS. 9a through 9d schematically illustrate a method of forming a fastening device 100 according to an aspect of the disclosure. According to an aspect, the fastening device 100 may be formed by a cold forming sequence. However, it will be appreciated that a variety of other suitable forming processes may be employed. According to an exemplary cold forming process, which differs from traditional processes for forming a traditional hex head fastener, a wire blank 200 is initially proved. As shown schematically in FIG. 9a, the wire blank 200 may be cut-off, as generally indicated by reference number 202, so that it has the proper volume for the final fastener for further processing. It will be appreciated that various cutting processes may be employed. As shown schematically in FIG. 9b, according to this aspect, a cone upset 204 may be formed in the blank 200, which can serve to enlarge the diameter of the blank 200.

Figures 9A, 9B, 9C, 9D:
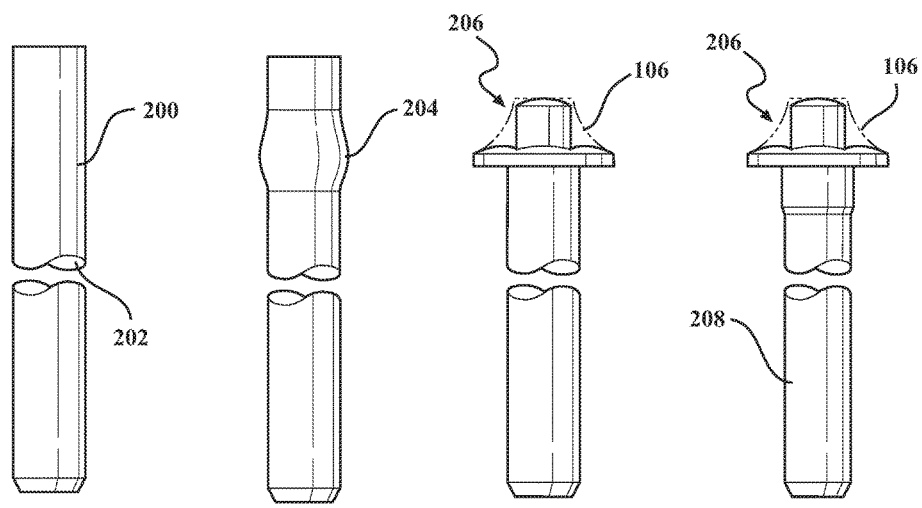
FIGS. 9(a) through 9(d) illustrate a method of forming a fastener device according to an aspect of the disclosure.

As shown in FIG. 9c, a head portion 106 having a desired shape can be formed therein. According to an aspect, the head portion 106 can have a shape that differs from a conventional hex-head design. Specifically, the punch side die can be configured to provide a head upset 206 consistent with one of the exemplary aspects shown and discussed herein. More specifically, the punch side die can be configured to provide a head upset with a geometric profile having a hex head design with four (4) points of contact. According to an aspect shown in FIG. 9d, the shank portion 102 may then be extruded to form a fastening device 100 of the desired size and shape, as generally indicated by reference number 208.

According to an aspect, the fastening device 100 can be formed from low carbon, boron and alloy steel materials. However, a variety of other suitable materials can be employed, including aluminum.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A fastening device for engaging a standard hex-shaped socket, comprising:
   a metal shank portion having a first end and a second end disposed remote from the first end;
   a metal head portion disposed adjacent to and integrally formed with the second end of the shank portion, the head portion having a body portion with a lower perimeter and an upper perimeter;
   the lower perimeter including a plurality of lower edge portions and a plurality of lower corners separating adjacent ones of the plurality of lower edge portions;
   the upper perimeter including a plurality of upper edge portions and a plurality of upper corners separating adjacent ones of the plurality of upper edge portions;
   the body portion including a plurality of surfaces extending between the upper perimeter and the lower perimeter;
   the plurality of upper edge portions, including a first pair of opposing upper edges each having a first upper edge length and a second pair of opposing upper edges each having a second upper edge length, wherein the second upper edge length is greater that the first upper edge length;

wherein the plurality of lower edge portions includes a first pair of opposing lower edges each having a first lower edge length;
wherein the first upper edge length is equal to the first lower edge length and wherein a pair of opposing side surfaces are defined between the first pair of opposing upper edges and the first pair of opposing lower edges which are oriented in generally parallel relation to one another.

2. The fastening device of claim 1, wherein the second pair of opposing upper edges have a concave shape as determined with respect to a center rotational axis of the fastening device.

3. The fastening device of claim 1, wherein the first pair of opposing upper edges are each configured to engage a respective surface of the standard hex-shaped socket along their length during loosening and tightening of the fastening device.

4. The fastening device of claim 3, wherein the second pair of opposing upper edges are configured to engage a respective surface of the standard hex-shaped socket along only a portion of their length.

5. The fastening device of claim 1, wherein the metal shank portion, includes a plurality of threads formed thereon.

6. The fastening device of claim 1, wherein the plurality of upper edge portions includes eight edges and eight corners.

7. The fastening device of claim 6, wherein the plurality of lower edge portions includes six edges and six corners, wherein the plurality of lower edge portions each have an equal length.

8. A fastening device, comprising:
a metal shank portion having a first end and a second end disposed remote from the first end;
a head portion disposed adjacent the second end of the shank portion and including a plurality of surfaces configured to engage a standard hex-shaped socket, the head portion having a lower perimeter adjacent the second end of the shank portion, an upper perimeter disposed remote from the lower perimeter and a body portion having a plurality of surfaces extending continuously between the lower perimeter and the upper perimeter;
the lower perimeter including a plurality of lower edge portions separated by a plurality of lower corners, wherein the lower perimeter is configured to engage the standard hex-shaped socket to facilitate loosening and tightening of the fastening device;
the upper perimeter including a plurality of upper edge portions separated by a plurality of upper corners, wherein the upper perimeter is configured to engage the standard hex-shaped socket to facilitate loosening and tightening of the fastening device; and
wherein the number of upper edge portions and upper corners differs from the number of surfaces in the standard hex-shaped socket.

9. The fastener of claim 8, wherein the upper perimeter has a different shape than the lower perimeter.

10. The fastener of claim 9, wherein the lower perimeter includes a generally hex shape with six lower corners and six lower edge portions.

11. The fastener of claim 8, wherein the shank portion includes one or more threads formed around an outer surface thereof.

12. The fastener of claim 8, wherein the shank portion includes a flange portion at the second end thereof, and the flange portion is disposed adjacent the head portion.

13. A fastening device, comprising:
a metal shank portion having a first end and a second end disposed remote from the first end;
a head portion disposed adjacent the second end of the shank portion and including a plurality of surfaces configured to engage a standard hex-shaped socket, the head portion having a lower perimeter adjacent the second end of the shank portion, an upper perimeter disposed remote from the lower perimeter and a body portion having a plurality of surfaces extending between the lower perimeter and the upper perimeter;
the lower perimeter including a plurality of lower edge portions separated by a plurality of lower corners, wherein the lower perimeter is configured to engage the standard hex-shaped socket to facilitate loosening and tightening of the fastening device;
the upper perimeter including a plurality of upper edge portions separated by a plurality of upper corners, wherein the upper perimeter is configured to engage the standard hex-shaped socket to facilitate loosening and tightening of the fastening device; and
wherein the number of upper edge portions and upper corners differs from the number of surfaces in the standard hex-shaped socket;
wherein the upper perimeter has a different shape than the lower perimeter;
wherein the upper perimeter includes at least two edge portions in common with the lower perimeter such that they are able to engage a common surface of a standard hex-shaped socket to facilitate tightening and loosening the fastening device.

14. The fastener of claim 13 wherein the plurality of surfaces of the body portion are configured to have four points of contact with the standard hex-shaped socket.

15. The fastener of claim 14, wherein the plurality of surfaces include a pair of opposing sidewalk that each serve as a single point of contact with the standard hex-shaped socket.

16. The fastener of claim 15, wherein the body portion has a first side that includes a first partial side surface that extends away from one of the pair of opposing sidewalls and a second partial side surface that extends away from the other of the pair of opposing sidewalls and toward the first partial side surface;
wherein the first partial side surface and the second partial side surface intersect at a first lower corner; and
wherein the first partial side surface and the second partial side surface on the first side of the body portion serves as a third point of contact.

17. The fastener of claim 16, wherein the body portion has a second side that opposes the first side and includes a first partial side surface that extends away from one of the pair of opposing sidewalls and a second partial side surface that extends away from the other of the pair of opposing sidewalls and toward the first partial side surface;
wherein the first partial side surface and the second partial side surface intersect at a second lower corner, which is opposite the first lower corner; and
wherein one of the first partial side surface or the second partial side surface on the second side of the body portion serves as a fourth point of contact.

18. The fastener of claim 17, wherein the first partial surface edge and the second partial surface edge each have a generally arcuate shape.

19. The fastener of claim 18, wherein the first partial surface edge and the second partial surface edge are spaced apart over substantially all of their length and define a chamfered surface therebetween;
    wherein the chamfered surface is recessed with respect to a first outer surface of the first partial side surface and a second outer surface of the second partial side surface.

20. The fastener of claim 19, wherein the chamfered surface has a generally concave shape.

21. The fastener of claim 16, wherein the first partial side surface has a first partial surface edge that begins adjacent a first upper corner to the first lower corner and wherein the second partial surface has a second partial surface edge that begins adjacent a second upper corner to the first lower corner.

22. The fastener of claim 21, wherein the first partial surface edge begins at the first upper corner and the second partial surface edge begins at the second upper corner.

23. The fastener of claim 21, further comprising:
    a first upper edge that extends away from the first upper corner and terminates at a first distal point and wherein the first partial surface edge begins at the first distal point;
    a second upper edge that extends away from the second upper corner and terminates at a second distal point and wherein the second partial surface edge begins at the second distal point.

\* \* \* \* \*